3,297,637
METHOD OF RACEMIZING OPTICALLY ACTIVE AMINO ACIDS USING INSOLUBLE RESINS HAVING ORTHO-DISUBSTITUTED BENZENE NUCLEI
Shiro Akabori, Ashiya-shi, Hyogo-ken, Yoshiharu Izumi, Kobe-shi, Hyogo-ken, Koji Toi, Suita-shi, Osaka-fu, and Ko Ohno, Tokyo, Japan, assignors to Ajinomoto Co., Inc., Tokyo, Japan, a corporation of Japan
No Drawing. Filed Jan. 15, 1963, Ser. No. 251,494
Claims priority, application Japan, Jan. 18, 1962, 37/979, 37/980, 37/981; Jan. 31, 1962, 37/2,811
8 Claims. (Cl. 260—53)

This invention relates to a method of racemizing optically active amino acids.

Optically active amino acids are prepared from synthetic DL amino acids or their derivatives by optical resolution. Biological and chemical methods are available for such resolutions. When only one optical isomer is economically useful, it is desirable to racemize the isolated other enantiomorph so that it may serve as raw material for another optical resolution step. Thus, a synthetic DL-amino acid may be converted completely into the desired optically active amino acid by alternating optical resolution and racemization.

It is known that optically active amino acids are generally racemized by prolonged heating in aqueous solutions of acids or alkalis. However, the process does not go to completion, and usually requires higher temperatures and pressures than can be employed without partial decomposition of the amino acid. It has been attempted to protect the amino radical of the acid by acetylation prior to racemization and to hydrolyze the racemic N-acetyl amino acid obtained but the process is not economically practical because of difficulties in recovering the racemate.

It is also known that the naturally occurring enzyme racemase catalyzes the racemization of amino acids in the presence of pyridoxal as a coenzyme. Enzymatic racemization occurs naturally under conditions of temperature and pressure which do not otherwise affect the amino acid structure.

Pyridoxal and other cyclic aldehydes have also previously been found to promote racemization of amino acids in the presence of certain metal ions, such as those of aluminum, iron and copper (D. E. Metzler et al., J. Am. Chem. Soc. 76, 648 (1954)). The catalytic effect of the aldehydes in the presence of metal ions has been found to be dependent on the presence of another functional group in ortho-position to the formyl radical of the aldehyde and capable of forming a metal chelate with the latter. Compounds known to catalyze the racemization of amino acids at relatively low temperatures in the presence of metal ions include salicylaldehyde, 4-nitrosalicylaldehyde, o-aminobenzaldehyde, o-formylbenzoic acid, furfural and nitrofurfural. These compounds are characterized by a ring having a system of conjugated double bonds, such as an aromatic carbon ring or the heterocyclic furan ring, which makes furfural analogous to benzaldehyde in many of its reactions.

The known catalytic aldehydes are soluble in solvents for amino acids in which racemization can take place and are effective only when so dissolved. It is relatively difficult to separate the known aldehyde catalysts from the racemate produced and, for this reason, racemization of amino acids in homogeneous phase under the catalytic influence of the aforedescribed cyclic aldehydes and metal ions is not practical on an industrial scale.

We have discovered water insoluble polymers having reactive functional groups corresponding to those of pyridoxal and of the other catalytic cyclic aldehydes, and capable of promoting racemization of alpha-amino acids in aqueous solutions which are in contact with the resinlike insoluble polymers. Complete racemization is usually possible with the resins of the invention at temperatures at which decomposition of the amino acid is insignificant.

The resins of the invention have repeating groups including a nucleus which is either a benzene ring or a heterocyclic unsaturated ring, a formyl radical directly bound to a carbon atom of the nucleus, and a second functional group in ortho position to the last-mentioned carbon atom. The second group may be a hydroxyl group or substituted hydroxyl group of phenolic character, an amino radical or a carboxyl group. When the nucleus is a furan nucleus, the oxygen atom of the ring provides the second functional group.

The catalytic resins of the invention may be prepared by two groups of reactions. In the first group of reactions, a monomer having the necessary functional groups or their equivalents attached to a nucleus is polymerized. In the second group of reactions, the functional groups are introduced into a polymer material.

It is not generally possible to polymerize a cyclic aldehyde, such as a benzaldehyde or furfuraldehyde derivative, without participation of the formyl groups in the polymerization or condensation reaction, whereby the polymer obtained lacks the aldehyde function. It is necessary to protect or mask the formyl group during the polymerization or condensation reaction. Conversion to a Schiff base or to an acetal prior to polymerization is sometimes possible, though not usually convenient. We have found that halogenation of the formly group to the corresponding dihalomethyl radical is possible under almost all conditions and that the hydrolysis of the dihalide to the aldehyde is readily performed.

In the second group of reactions leading to the catalytic resins of the invention, the alkyl side chain of an ortho-cresol formaldehyde resin or of an ortho-cresol-phenol-formaldehyde resin may be oxidized to the formly group. Resins having reactive amino radicals, such as polyaminostyrene or para-aminobenzyl cellulose, may be diazotized and coupled in the presence of alkali with an aromatic or heterocyclic compound carrying the specific functional groups capable of forming chelates, such as pyridoxal or salicylaldehyde. A wide variety of resins insoluble in aqueous systems and suitable as racemization catalysts may thus be synthesized by nitrating a polymer having aromatic or heterocyclic nuclei, reducing the nitro groups to the corresponding amino radicals in a conventional manner, diazotizing the amino radicals and coupling them to salicylaldehyde and the like.

The optically active amino acids which are readily racemized in the presence of the catalytic resins of the invention and of suitable metal ions, such as those of copper, aluminum, iron and zinc, at relatively low temperatures include the optically active forms of glutamic acid, lysine, valine, arginine, phenylalanine, aspartic acid and methionine, but the racemization of all other amino acids in aqueous solution is enhanced at least to some extent by the catalytic resins of the invention in the presence of metal ions.

The racemizing effect of the resins is believed to be due at least in part to selective adsorption of the amino acid on the active centers of the resin and to the resulting localized high concentration of amino acid on the resin surface, but a complete understanding of the underlying mechanism is not necessary for successful performance of our method.

The resins of the invention also catalyze deamination, transamination and other reactions of the amino acids in an acid medium. Such secondary reactions may be substantially completely suppressed by maintaining the amino acid solution at a pH above 8, preferably at a pH of approximately 10, during the racemization. The rate of racemization is substantially increased, at elevated temperatures, that is, temperatures higher than the usual room temperature of about 20° C., without concomitant increase in the rate of the side reactions. Racemization by the catalytic resins of the invention is, therefore, preferably carried out at temperatures above 80° C. It is desirable to operate at or near 100° C.

When racemizing amino acids on an industrial scale, we have found it most practical to pack a heated tower with the insoluble resins and to pass an aqueous solution of the optically active resin and of a suitable metal salt through the tower in a continuous stream. For batch operation on a large scale, the insoluble resins are kept suspended in an aqueous solution of the amino acid and the metal salt by means of an agitator until the desired racemization is achieved, whereupon the solution may be separated from the resin by decanting, by centrifuging, by filtering or in any other conventional manner.

The following examples are further illustrative of the method of the invention, but it will be understood that the invention is not limited to the examples.

*Example I*

Eleven grams of salicylaldehyde were added drop by drop to 30 grams phosphorus pentachloride. As the salicylaldehyde was converted to the corresponding o-benzalchloride derivative, the solid phosphorus pentachloride disappeared, and a homogeneous liquid reaction mixture was obtained. 30 milliliters water were cautiously added to the mixture which thereupon separated into an oily bottom layer, and a lighter aqueous layer which was discarded.

The oily product was intimately mixed with 1 gram resorcinol and 8 milliliters 37% aqueous formaldehyde. The mixture was heated in a pressure vessel to 130° C. for 15 hours. The block of black resinous material formed was pulverized, and the powder was hydrolyzed with 50 milliliters normal sodium hydroxide solution at 70° C. for 3 hours to remove the chlorine and to restore the formyl radicals.

A powdery resin material was separated from the aqueous phase, washed with dilute acid to remove adherent alkali, and then with water, and dried.

*Example II*

5 milliliters of an aqueous 10 percent solution of L-glutamic acid were adjusted to pH 10 with sodium hydroxide. One milliliter of an aqueous 1.7 percent solution of cupric chloride and one gram of the powdery resin prepared in Example I were admixed. The mixture was sealed in a glass tube and heated to 100° C. for three hours. A sample of the mixture was then withdrawn, diluted with an equal volume of 12 N hydrochloric acid, and tested for its specific rotation. The glutamic acid was found to be 64 percent racemized. No significant amount of glutamic acid was lost by decomposition.

Cobalt, zinc, magnesium, or other polyvalent ions may be substituted for divalent copper ions to form a chelate having catalytic effects.

*Example III*

An ortho-cresol-phenol-formaldehyde resin (9:1:20) was comminuted to a particle size of 50 to 200 mesh. 185 grams of the comminuted resin were suspended in 500 milliliters acetic anhydride, and a few drops of concentrated sulfuric acid were added. After the mixture had been stirred for one hour, a further addition of 1000 milliliters acetic anhydride and 500 milliliters glacial acetic acid was made.

The methyl side chains of the resin were then oxidized by the admixture of 150 grams concentrated sulfuric acid added drop by drop with cooling and stirring, followed by 60 grams chromium trioxide added in small amounts while the temperature was being maintained below 5° C. The resulting mixture was stirred for 12 hours.

It was then slowly poured into 3000 milliliters of strongly agitated water, and the solid material precipitating was separated from the liquid phase by centrifuging. The separated solid resin was refluxed with 1000 ml. 4 normal hydrochloric acid for four hours. It was then filtered off, washed with water, and dried.

*Example IV*

The racemization of L-alanine, L-glutamic acid, and L-aspartic acid was carried out in parallel runs. In each run, 100 milliliters of an aqueous 0.2 molar solution of the amino acid containing 0.45 gram cupric chloride dihydrate were adjusted to pH 10 with sodium hydroxide. 15 milliliters of each solution were mixed with 15 milliliters of a 0.2 molar borate buffer at pH 10, and 5 grams of the catalytic resin produced in Example III. The mixtures were heated to 100° C., and samples were withdrawn at each time to determine the percentage of racemate in the amino acid present.

| Time (hrs.) | Percent racemate in— | | |
| --- | --- | --- | --- |
| | L-alanine | L-glutamic acid | L-aspartic acid |
| 1 | 51 | 17 | 26 |
| 2 | 77 | 20 | 42 |
| 3 | 100 | 27 | 61 |
| 4 | 100 | 40 | 68 |
| 5 | | 47 | 74 |
| 6 | | 53 | 87 |
| 7 | | 67 | 94 |
| 8 | | | 100 |

*Example V*

Forty grams of the resin obtained in Example III were buffered with a borate buffer to pH 10.0–10.3, and were packed in a jacketed glass column having a length of 50 centimeters and an internal diameter of two centimeters. The resin layer was 30 centimeters long, and was kept at a temperature of 80° C. by the passage of hot water through the jacket.

An aqueous molar solution of L-alanine containing 0.1 moles cupric acetate per liter was adjusted to pH 10.0–10.3 by means of sodium hydroxide, and was passed through the column in a continuous stream the flow rate of which was changed from time to time. The time required for discharge of 5 milliliters of solution from the bottom of the column was measured at the several flow rates. The total concentration of alanine in percent of original concentration, and the percentage of racemate in the recovered alanine were determined for the 5 milliliter samples.

| Flow rate, min. per 5 ml. | Alanine recovered, percent | Racemic alanine, percent |
| --- | --- | --- |
| 3.5 | 59 | 88 |
| 8 | 91 | 91 |
| 13 | 100 | 91 |

Example VI 9.5 grams polyaminostyrene were suspended in 65 milliliters 4 normal hydrochloric acid. 40 milliliters of an aqueous solution containing 5.8 grams sodium nitrite were added drop by drop over a period of one hour while the temperature of the mixture was kept at 0° C. The solids were separated from the aqueous phase by filtration with suction, and were washed with aqueous 5 percent urea solution. They were then added to a solution of 14 grams salicylaldehyde and 4.8 grams sodium hydroxide in 170 milliliters water. The reaction mixture was cooled with ice water and stirred for five hours. The coupled resin was filtered off, washed with dilute sodium hydroxide solution and then with water, and finally dried.

Insoluble derivatives of 4-formyl imidazole are obtained in an analogous manner.

Example VII

A solution containing one mole L-alanine, 0.03 mole cupric chloride, and 0.1 mole borate per liter was adjusted to pH 10 with sodium hydroxide. Thirty milliliters of the solution were stirred with five grams of the resin prepared in Example VI at 100° C. Samples were withdrawn from the mixture from time to time, filtered, diluted with an equal volume of 12 N hydrochloric acid, and analyzed for conversion of the L-alanine to the racemic form.

| Time, hrs.: | Racemate, percent |
|---|---|
| 0.5 | 28 |
| 1 | 32 |
| 2 | 50 |
| 3 | 58 |
| 4 | 67 |
| 5 | 75 |
| 6 | 88 |

The aforementioned insoluble furfural derivatives catalyze racemization in a similar manner.

Example VIII.—Cellulose-ion exchanger type PAB prepared by Serva Co.

Ten grams para-aminobenzyl cellulose were suspended in 10 milliliters ice cold normal hydrochloric acid. A solution of 0.3 gram sodium nitrite in 2 milliliters water was added drop by drop over a period of one hour with stirring while the temperature of the mixture was held at 0° C. The diazotized insoluble resin was filtered off and washed first with a 2 percent sodium acetate solution, then with a 2 percent urea solution. It was then coupled by mixing with a solution of 1.3 grams salicylaldehyde, 1.3 grams sodium carbonate, and 20 milliliters water. The mixture was stirred at 0° C. for five hours. The coupled resin was filtered off, washed with water, and dried.

Example IX 5 milliliters of an L-alanine solution containing 10 percent L-alanine and 0.17 percent cupric chloride, and adjusted to pH 10 with NaOH, were sealed in a glass tube with one gram of the resin prepared in Example VIII. The tube was heated to 100° C. for three hours. Its contents were then analyzed, and the alanine was found to contain 20 percent racemate.

Example X

Ten grams of a comminuted salicyclic acid-phenol-formaldehyde resin (2:1:10) were swelled in N-dimethylformamide, and the swelled resin was stirred at 0° C. into 65 milliliters thionyl chloride. Stirring was continued for three hours. The resin so modified was filtered from the liquid, washed with chloroform, and agitated at 0° C. for 5 hours in a mixture of 60 milliliters chloroform, 20 milliliters aniline, and 10 milliliters triethylamine. The mixture then was allowed to stand overnight at room temperature, and filtered. The solid anilide product was washed with chloroform and dried.

12 grams phosphorus pentachloride were dissolved in 100 milliliters toluene, the anilide product was added, and the mixture was stirred at 90° C. for six hours. The corresponding chloroimine was formed. It was filtered off, washed with toluene, and then reduced by stirring it with a solution of 40 grams stannous chloride dihydrate in 200 milliliters of ether saturated with hydrogen chloride. When reduction was completed, the mixture was filtered, the solids were washed with ether and then stirred with 200 milliliters normal hydrochloric acid at 60° C. for six hours. The final resin product so obtained was thoroughly washed with water, and dried in a vacuum. The resin yield was 12 grams.

Example XI

Five grams of the resin prepared in Example X and 30 milliliters of the L-alanine solution described in Example VII were stirred at 100° C. Samples of the mixture were withdrawn from time to time, filtered, diluted with an equal volume of 12 normal hydrochloric acid, and tested for optical rotation. The percentage of racemate in the alanine was as follows:

| Time (hours): | Percent racemate |
|---|---|
| 0.5 | 28 |
| 1 | 38 |
| 2 | 63 |
| 3 | 72 |
| 4 | 75 |
| 5 | 85 |
| 6 | 92 |

While the invention has been described with particular reference to specific embodiments, it is to be understood that it is not limited thereto but is to be construed broadly and restricted solely by the scope of the appended claims.

What is claimed is:

1. A method of racemizing an optically active alpha-amino acid which comprises contacting an aqueous solution of said amino acid containing a polyvalent metal ion with a resinous polymer insoluble in said solution and having repeating groups consisting of ortho-disubstituted benzene nuclei, one of the substituents of each benzene nucleus being a formyl radical, and the other substituent being a group capable of forming a chelate ring with said metal ion and said formyl radical.

2. A method as set forth in claim 1, wherein said aqueous solution is maintained at elevated temperature and at a pH value higher than 8 while contacting said resinous polymer.

3. A method as set forth in claim 2, wherein said temperature is at least 80° C.

4. A method as set forth in claim 1, wherein said metal ion is a copper ion.

5. A method of racemizing an optically active alpha-amino acid which comprises contacting an aqueous solution of said amino acid containing cupric ions and having a pH value higher than 8 and a temperature higher than 20° C. with a resinous polymer insoluble in said solution and having repeating groups consisting of ortho-disubstituted benzene nuclei, one of the substituents of each benzene nucleus being a formyl radical, and the other substituent being a phenolic hydroxyl radical.

6. A method as set forth in claim 5, wherein said amino acid is selected from the group consisting of glutamic acid, lysine, valine, arginine, phenylalanine, aspartic acid, methionine, and alanine.

7. A method of racemizing an optically active alpha-amino acid which comprises contacting an aqueous solution of an optically active amino acid containing a polyvalent metal ion at a pH higher than 8 and a temperature higher than 20° C. with a resinous polymer insoluble in said solution and having repeating groups consisting of a furan nucleus having a formyl radical directly attached to a carbon atom adjacent the oxygen atom of said furan nucleus, said polyvalent metal ion being capable of forming a chelate ring with said formyl radical and said oxygen atom.

8. A resinous polymer insoluble in water and having repeating groups of ortho-disubstituted benzene nuclei, one of the substituents of each benzene nucleus being a formyl radical, and the other substituent being phenolic hydroxyl.

References Cited by the Examiner
UNITED STATES PATENTS
2,683,151  7/1954  Hillyer et al. _____ 260—346.2

OTHER REFERENCES

Morrell, R.S., Synthetic Resins, Oxford Press, N. Y. and London 1951 (pp. 136–137 of article by Redfarn relied on).

Journal of Biological Chemistry, 199, 1952 (pp. 669–674 relied on), Olward et al.

Journal of American Chemical Society, 76, 1954 (p. 648 relied on), Metzler et al.

WILLIAM H. SHORT, *Primary Examiner.*

H. SCHAIN, *Assistant Examiner.*